US010623266B2

(12) United States Patent
Gharpure et al.

(10) Patent No.: US 10,623,266 B2
(45) Date of Patent: Apr. 14, 2020

(54) CROSS ENTITY ASSOCIATION CHANGE ASSESSMENT SYSTEM (71) Applicant: HONEYWELL INTERNATIONAL INC., Morris Plains, NJ (US)

(72) Inventors: Meenal Gharpure, Karnataka (IN); Antoine Guillot, Doylestown, PA (US); Janardhan Ramachandra, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 505 days.

(21) Appl. No.: 15/372,932

(22) Filed: Dec. 8, 2016

(65) Prior Publication Data
US 2018/0167281 A1 Jun. 14, 2018

(51) Int. Cl.
H04L 12/24 (2006.01)
H04L 29/08 (2006.01)
H04L 29/06 (2006.01)
G06F 15/16 (2006.01)

(52) U.S. Cl.
CPC .......... H04L 41/12 (2013.01); G06F 15/16 (2013.01); H04L 41/0853 (2013.01); H04L 41/0873 (2013.01); H04L 41/145 (2013.01); H04L 63/20 (2013.01); H04L 67/12 (2013.01); H04L 67/34 (2013.01); H04L 67/36 (2013.01)

(58) Field of Classification Search
CPC .......... H04L 63/20; G06F 15/16; G05B 1/418
See application file for complete search history.

(56) References Cited

U.S. PATENT DOCUMENTS

| | | | | |
|---|---|---|---|---|
| 5,857,107 A * | 1/1999 | Tsuchida | ................... | G06F 8/70 717/170 |
| 8,239,543 B1 * | 8/2012 | Ramany | ................ | G06F 3/0604 709/227 |
| 9,020,614 B2 | 4/2015 | Fujieda et al. | | |
| 9,397,836 B2 * | 7/2016 | Nixon | ............. | G05B 19/41855 |
| 9,489,397 B1 * | 11/2016 | Olson | ..................... | G06F 16/29 |
| 9,535,415 B2 * | 1/2017 | Keller | ................ | G05B 19/0428 |
| 9,541,905 B2 * | 1/2017 | Nixon | .................... | G05B 11/01 |
| 9,558,220 B2 * | 1/2017 | Nixon | .................... | G05B 15/02 |
| 9,697,170 B2 * | 7/2017 | Nixon | ................ | G05B 19/4185 |
| 9,823,626 B2 * | 11/2017 | Zornio | .................... | G06F 16/00 |
| 10,169,135 B1 * | 1/2019 | Pandey | ............. | G05B 19/0428 |
| 2003/0061295 A1 * | 3/2003 | Oberg | ................... | H04W 4/029 709/208 |
| 2005/0144188 A1 * | 6/2005 | Bailey | .................... | G06F 11/008 |
| 2006/0025908 A1 * | 2/2006 | Rachlin | ............. | G05B 23/0251 701/31.4 |
| 2007/0186010 A1 * | 8/2007 | Hall | .................... | H04L 12/4625 709/246 |

(Continued)

Primary Examiner — Lashonda T Jacobs (57) ABSTRACT

A system and method of assessing changes within subsystems of an integrated industrial control system (IICS). The subsystems are all in communication with a cross entity association identification (CEAI) computer. The method includes receiving, via the CEAI computer, a request for cross associations for a selected entity in any one of the plurality of subsystems and displaying cross entity association (CEA) data associated with the selected entity. The CEA data includes all associations and dependences present for the selected entity across any of the plurality of subsystems.

15 Claims, 7 Drawing Sheets (56) References Cited

U.S. PATENT DOCUMENTS

| | | | |
|---|---|---|---|
| 2007/0186011 A1* | 8/2007 | Batke | H04L 41/0213 709/246 |
| 2010/0153771 A1* | 6/2010 | Gordon | G05B 19/4185 714/4.1 |
| 2010/0280755 A1* | 11/2010 | Pillsbury | G06Q 30/02 702/2 |
| 2011/0060427 A1* | 3/2011 | Batke | G05B 23/0267 700/79 |
| 2011/0137705 A1* | 6/2011 | Srinivasan | G06Q 10/06 705/7.28 |
| 2013/0031610 A1* | 1/2013 | Weaver | G06F 21/6209 726/4 |
| 2014/0032172 A1* | 1/2014 | McCarthy | G05B 23/0227 702/183 |
| 2014/0032470 A1* | 1/2014 | McCarthy | G06N 5/02 706/47 |
| 2014/0101419 A1* | 4/2014 | Giddi | G06F 11/0742 713/1 |
| 2014/0115012 A1* | 4/2014 | Das | G06F 16/211 707/803 |
| 2014/0250153 A1 | 9/2014 | Nixon et al. | |
| 2014/0280678 A1* | 9/2014 | Nixon | G05B 19/4185 709/213 |
| 2015/0046697 A1* | 2/2015 | Galpin | H04L 63/0884 713/155 |
| 2015/0046701 A1* | 2/2015 | Rooyakkers | H04L 9/083 713/156 |
| 2015/0220080 A1* | 8/2015 | Nixon | G05B 19/418 700/19 |
| 2016/0043866 A1* | 2/2016 | Nixon | G05B 19/41855 713/168 |
| 2016/0261482 A1* | 9/2016 | Mixer | H04L 43/12 |
| 2017/0270318 A1* | 9/2017 | Ritchie | G06Q 40/025 |
| 2017/0331929 A1* | 11/2017 | Zielinski | H04W 76/10 |
| 2017/0357249 A1* | 12/2017 | Sandler | G05B 19/41835 |
| 2017/0357250 A1* | 12/2017 | Sandler | G05B 19/41835 |
| 2017/0357908 A1* | 12/2017 | Cabadi | G05B 13/0265 |
| 2018/0176335 A1* | 6/2018 | McNab | G05B 19/0426 |
| 2018/0276375 A1* | 9/2018 | Arov | H04L 63/1416 |

\* cited by examiner

CROSS ENTITY ASSOCIATION CHANGE ASSESSMENT SYSTEM

FIELD

Disclosed embodiments relate to process control systems and more specifically to activities following the reconfiguring of an entity such as a tag in a subsystem of a process control system.

BACKGROUND

Processing facilities (or industrial facilities) are often managed using process control systems also known as control and instrumentation (C&I) systems. Processing facilities can include manufacturing plants, chemical plants, crude oil refineries, ore processing plants, and paper or pulp manufacturing plants referred to herein as an integrated industrial control system (IICS). These industries typically use continuous processes and fluid processing and/or batch processing. The control system(s) typically manage the use of motors, valves, sensors, gauges and other industrial equipment in the processing facilities. A manufacturing plant or refinery may use one or more distributed control systems (DCS), programmable logic controls (PLC), safety system and applications for controlling different processes.

An IICS comprises multiple subsystems such as process, supervisory control and data acquisition (SCADA), safety, alarm management, human machine interface (HMI), operations, asset management, user management, and operator stations. These subsystems can be from several different manufacturers and vendors. These subsystems can be tightly integrated through cross platform or entity associations and references. The entities can comprise tags\points, alarms, assets, HMI elements and users. For example a tag present in a first process subsystem (such as a SCADA subsystem) can be the driving input or output to or from another tag in a second process subsystem (such as a safety subsystem). Each subsystem can have their own individual tools which manage these entities. Examples of these tools include process control configuration tools provided by Honeywell International such as the CONTROL BUILDER, QUICK BUILDER, HMI DISPLAY BUILDER in EXPERION, SAFETY BUILDER TOOL for safety subsystems, and other vendor specific configuration and management tools.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize that making changes to entities (such as tags\points, alarms, assets, HMI elements and users) in subsystems of an IICS having multiple different subsystems with some coupling together require manual assessment of the impact of the reconfiguration potentially across any of the heterogeneous subsystems and related tools in the IICS. This can be a major problem because manually scanning through all of the subsystems to determine those impacted by an entity change is a time consuming process with a lengthy learning curve. The manual scanning can lead to unnecessary delay, miscommunication and/or mistakes or errors. The result of an incorrect reconfiguration can be orphaned or dangling tag\points in a subsystem, incorrect system configuration, downtime in the industrial facility (IF) having the IICS, and/or a delay in migration to a newer software upgrade.

Disclosed embodiments solve the problem of assessing the impact of changes to an entity in one subsystem that is coupled to and thus impacts one or more other subsystems in an IICS of an IF by providing a method, a cross entity identification (CEAI) computer and computer program product that aggregates collected subsystem data received from respective subsystems in a common generic format for display. There is a data agent in each subsystem that has information regarding the data format, syntax, network type and communication method specific to the various subsystems that enables collection of the subsystem data. The subsystem data is aggregated into a common generic format by data parsers at the CEAI computer, which is then converted to CEA data ready to be displayed. This enables the CEAI computer to provide a user information in a unified view of all cross associations to other subsystems related to a given user' selected entity in any of the subsystems.

Disclosed embodiments include a method of assessing changes within subsystems of an IICS. The subsystems are all in communication with a CEAI computer. The method includes receiving, via the CEAI computer, a request from a user for cross associations for a selected entity in any of the plurality of subsystems and displaying CEA data associated with the selected entity. The CEA data is aggregated subsystem data in a common generic format that is collected from the respective subsystems. The CEA data includes all associations and dependences for the selected entity across any of the subsystems.

Disclosed embodiments further include a system for assessing changes within an IICS. The system includes a CEAI computer communicatively coupled by a communication network to a plurality of subsystems. The CEAI computer includes a first processor connected to a first memory device having a first non-transitory machine-readable storage medium storing a CEAI program. The CEAI computer is programmed to implement the CEAI program causing the CEAI computer to receive a request from a user for cross associations for a selected entity in any of the plurality of subsystems and display CEA data associated with the selected entity. The CEA data includes all associations and dependences for the selected entity across any of the subsystems.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Figure 1:
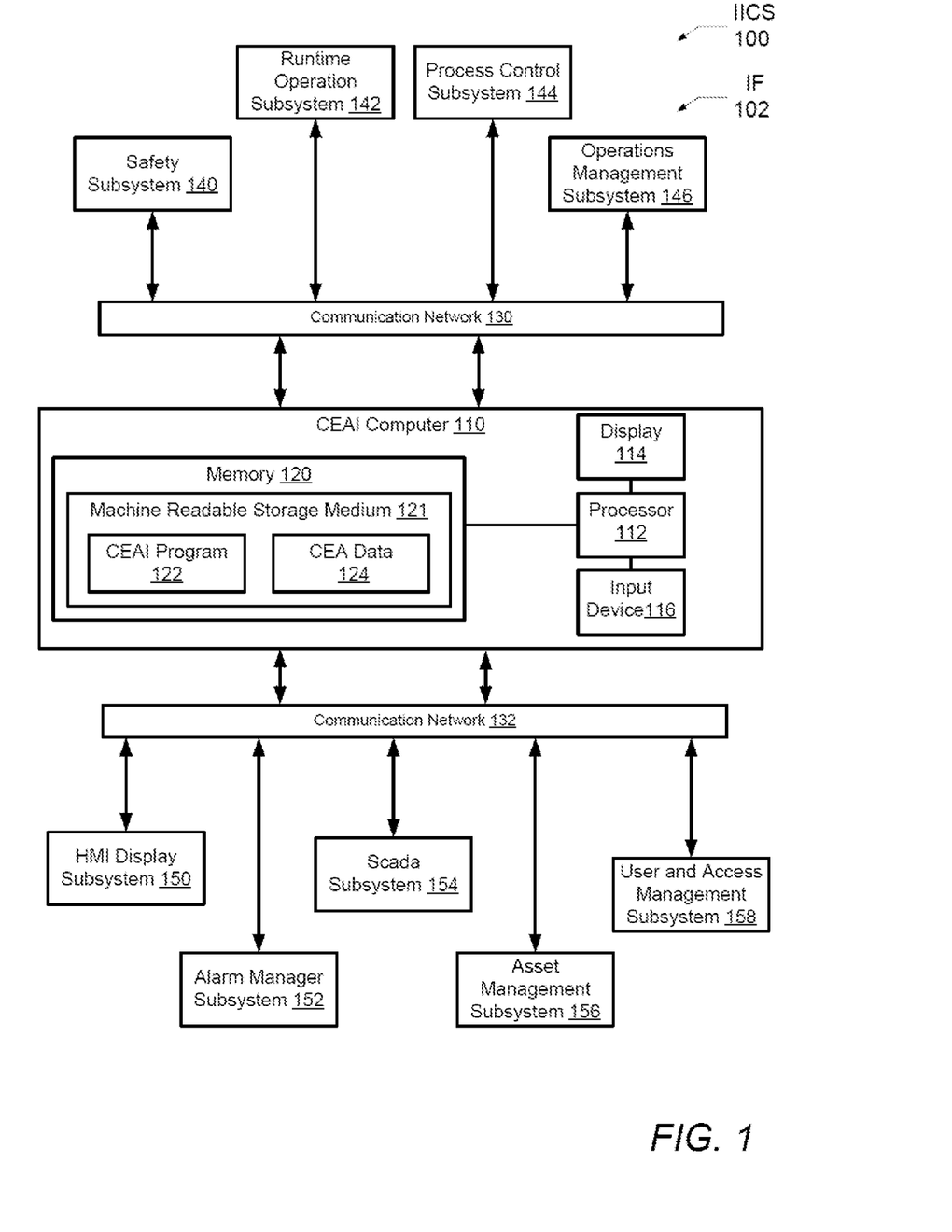
FIG. 1 is a diagrammatic view of hardware and software components in an IICS including a CEAI computer and subsystems for assessing changes to entity configurations across any of the subsystems in an IICS, according to an example embodiment.

Disclosed embodiments provide a method, system and computer program product for assessing changes to entity configurations in an IICS. FIG. 1 shows an example IICS 100 that assesses changes to entity configurations in an IF 102. TICS 100 comprises the blocks shown in FIG. 1 including CEAI computer 110 coupled to a plurality of subsystems 140, 142, 144, 146, 150, 152, 154, 156 and 158. CEAI computer 110 includes a processor 112 that is coupled to a memory device or memory 120, a video display 114 and an input device 116 such as a keyboard and mouse. Memory 120 includes a non-transitory machine readable storage medium 121 that stores a CEAI program 122 and CEA data 124. CEAI computer 110 is communicatively coupled to communication network 130 and communication network 132.

In one embodiment, CEAI program 122 can be executed from any computer within IICS 100 so that a separate CEAI computer 110 is not needed. For example a computer in any one of subsystems 140-158 can be used to execute the CEAI program 122 to perform the methods disclosed herein. Communication networks 130 and 132 can be a wide variety of wireless or wired communication networks such as Ethernet, fault tolerant Ethernet (FTE), a Local Control Network (LCN), a wireless network, a wide area network (WAN) or the Internet.

The subsystems shown include safety subsystem 140, runtime operation subsystem 142, process control subsystem 144 and operations management subsystem 146, which are communicatively coupled to communication network 130. The subsystems shown also include HMI display subsystem 150, alarm manager subsystem 152, SCADA subsystem 154, asset management subsystem 156 and user and access management subsystem 158, which are communicatively coupled to communication network 132.

Figure 2:
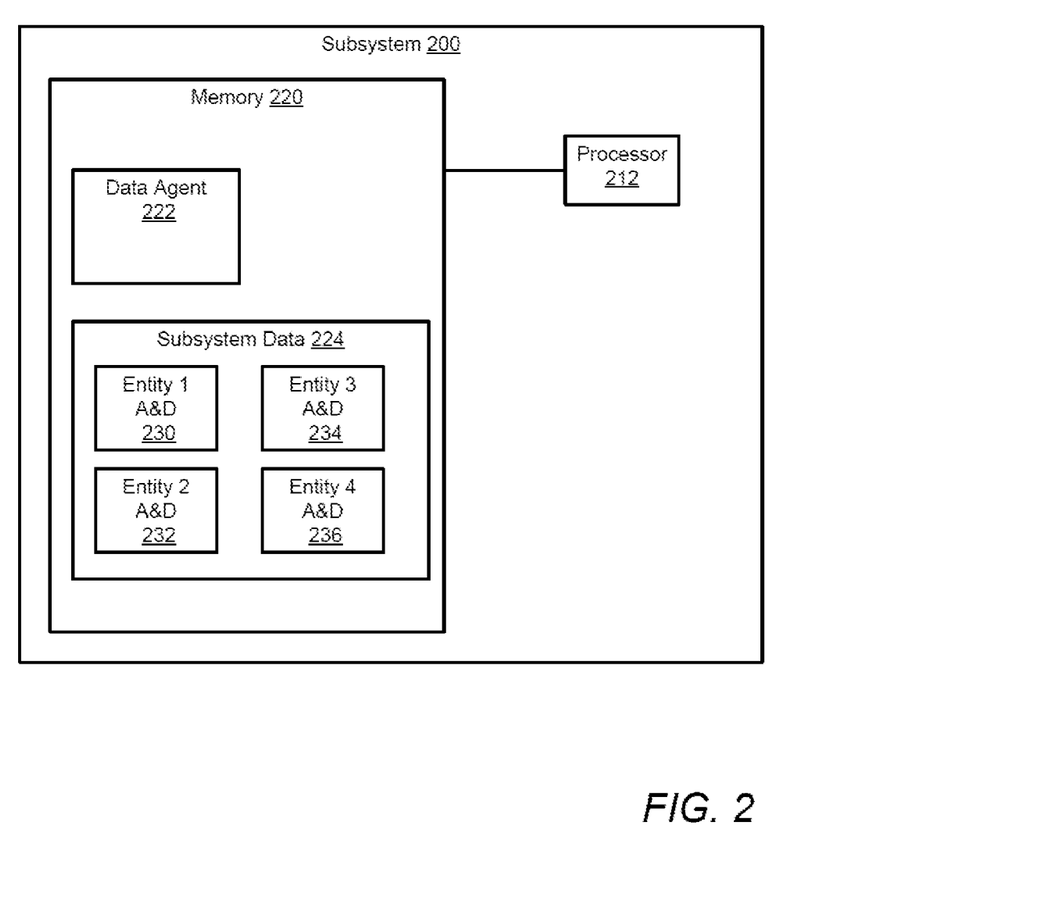
FIG. 2 is a block diagram of a generic subsystem.

FIG. 2 illustrates an example generic subsystem 200. Subsystem 200 represents at least a portion of the entities that are found in each of the subsystems 140-158. Subsystem 200 includes a processor 212 that is coupled to a memory 220. Memory 220 stores a data agent 222 and subsystem data 224 so that there is thus a data agent 222 and subsystem data 224 in each subsystem 200. The data format, syntax and network type and communication method specific to the various subsystems needed for the data agent 222 to collect the subsystem data 224 can be gathered from highly skilled individuals which perform a detailed analysis of the respective subsystems during development of the data agent 222. The data agent 222 once developed will thus have all the required knowledge (file format, syntax, network type and communication method) needed to retrieve the subsystem data 224 related to an entity's association or dependency. The data agent 222 generally also adheres to the data and service contracts and rules of the respective subsystems in order to collect the subsystem data 224. As described below relative to FIG. 3 the provider manager module 314 of the CEAI will interact with these data agents 222 in the various subsystems to collect the needed subsystem data 224 being subsystem specific data comprising entity association and dependency data that is to generate the CEA data 124.

Processor 212 executing data agent 222 can collect subsystem data 224 including cross association data from the respective subsystems where the data agent 222 exists and store the collected subsystem data 224 to memory 220. Processor 212 can transmit the collected subsystem data 224 to CEAI computer 110 via a respective communication network 130 or 132. Subsystem data 224 can include entity 1 association and dependency (A&D) data 230, entity 2 A&D data 232, entity 3 A&D data 234 and entity 4 A&D data 236 which can include cross association data. In one embodiment, the entity association and dependency A&D data 230-236 can include data for the entities such as tags\points, alarms, assets, HMI elements and users.

Figure 3:
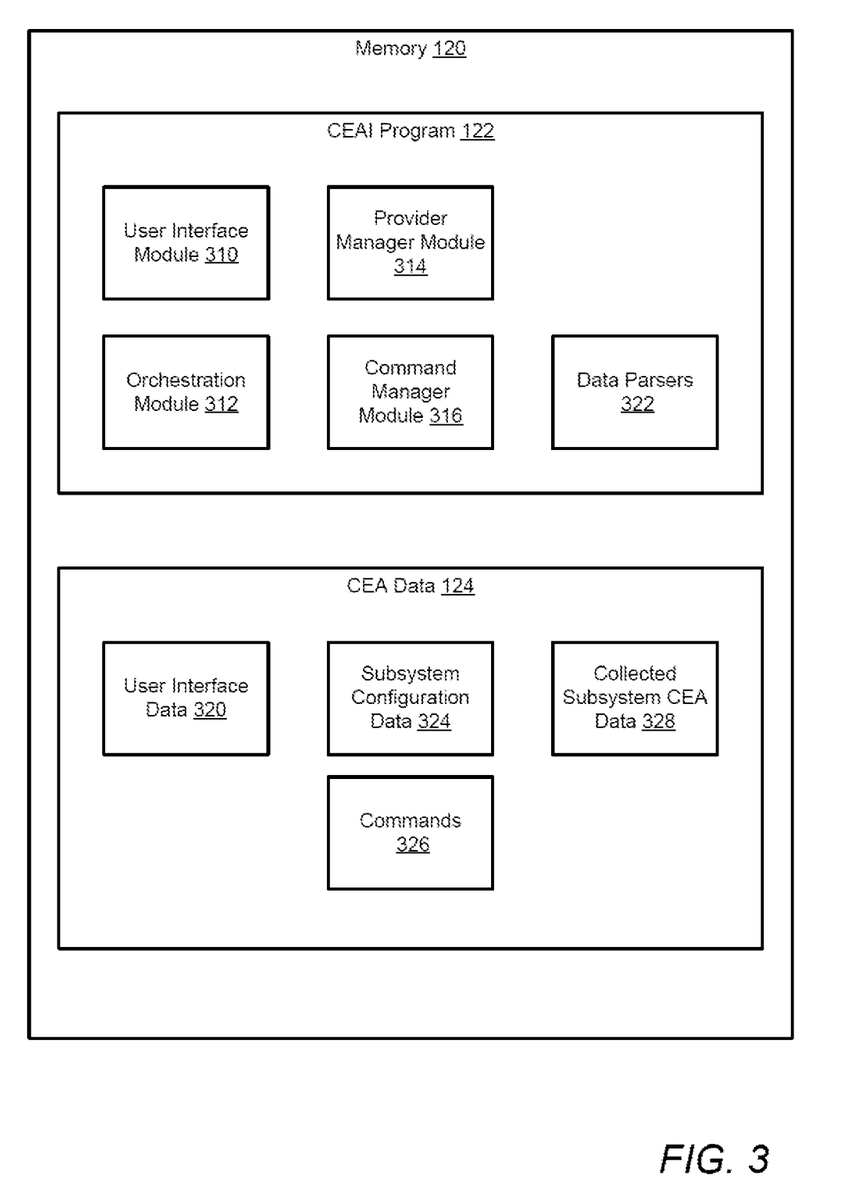
FIG. 3 illustrates contents of a CEAI computer memory, according to an example embodiment.

FIG. 3 illustrates contents of memory 120 of an example CEAI computer 110. Memory 120 stores or contains CEAI program 122 and CEA data 124. CEAI program 122 executing on processor 112 can assess the impact of entity configuration changes across subsystems 140-158. CEAI program 122 includes several modules including user interface module 310, orchestration module 312, provider manager module 314, command manager module 316 and data parsers 322.

User interface module 310 is a software module that contains the graphical user interface for receiving user requests for performing cross entity association identification that is displayed via a display 114. A process engineer or user can specify assessment criteria, select one or more entities, view the associations, sort, filter, export or save the associations through the user interface provided by user interface module 310 and viewable on display 114. Orchestration module 312 provides the infrastructure and subsystem knowledge for detecting and interacting with the respective various heterogeneous subsystems 140-158 to obtain the cross entity association information. Furthermore, orchestration module 312 interprets the assessment criteria specified by a process engineer or other user and commands the subsystems 140-158 to discover and transmit the required information about the given entities' cross associations and dependencies.

Provider manager module 314 functions as an interpreter between the subsystems 140-158 and the CEAI computer 110. Provider manager module 314 can fan out to many subsystem specific components which will perform the processing of subsystem data obtained by the subsystem specific data agent 222 in each subsystem to obtain the required cross association information from the respective subsystems aggregated by the CEAI computer to generate the CEA data 124. Provider manager module 314 provides the knowledge of a blueprint of what operations can be performed through various other subsystem specific providers. Subsystems 140-158 communicate and interact with orchestration module 312 and provider manager module 314 with subsystem data 224 used to obtain the CEA data 124. Orchestration module 312 and provider manager module 314 executing on processor 112 function to communicate with specific subsystems through their data agent 222, understand its data retrieval mechanism and obtain the subsystem data or for the specific entities. This information is then transmitted back to CEAI computer 110 where it is stored as CEA data 124.

After the cross entity associations and dependencies have been identified and displayed to a process engineer or user, command manager module 316 delivers the commands as selected by the process engineer or user to the specific subsystem for the resolution of any conflicts that have been identified. For example if the user decides that a cross entity association should be deleted or that the entity itself should be renamed, the user can trigger such commands via input device 116, user interface module 310 and command manager module 316 to the respective subsystems 140-158 to resolve the conflicts. After the respective subsystem has completed the assigned task, a notification is returned to the CEAI computer 110 as a system notifications, status report or alert. As described above, data parsers 322 contain the data format and syntax information used in respective subsystems to handle data and information in the subsystem data returned from subsystem queries. Data parsers 322 are responsible for parsing and converting subsystem data received from the subsystems into a common generic format.

CEA data 124 includes user interface data 320, subsystem configuration data 324, commands 326 and collected subsystem CEA data 328. User interface data 320 is data to be displayed on display 114 and input received from a user via input device 116. The CEAI program 122 includes data parsers 322 which contain the data format and syntax information used in respective subsystems to handle data and information in the subsystem data returned from subsystem queries. Data parsers 322 are responsible for parsing and converting the subsystem data received from the subsystems into a common generic format.

Subsystem configuration data 324 contains information about the components, connections and configuration of the subsystems 140-158. In one embodiment, subsystem configuration data 324 includes information including locations that store data for the subsystems, the file format used in the subsystem including connectivity details such as the machine name and IP address and any required credentials to connect to the subsystem to enable their respective data agent 222. Commands 326 contain commands generated by command manager 316 for transmission to the subsystems. Collected subsystem CEA data 328 contains all of the subsystem data received or returned from the subsystems 140-158.

Figure 4A:
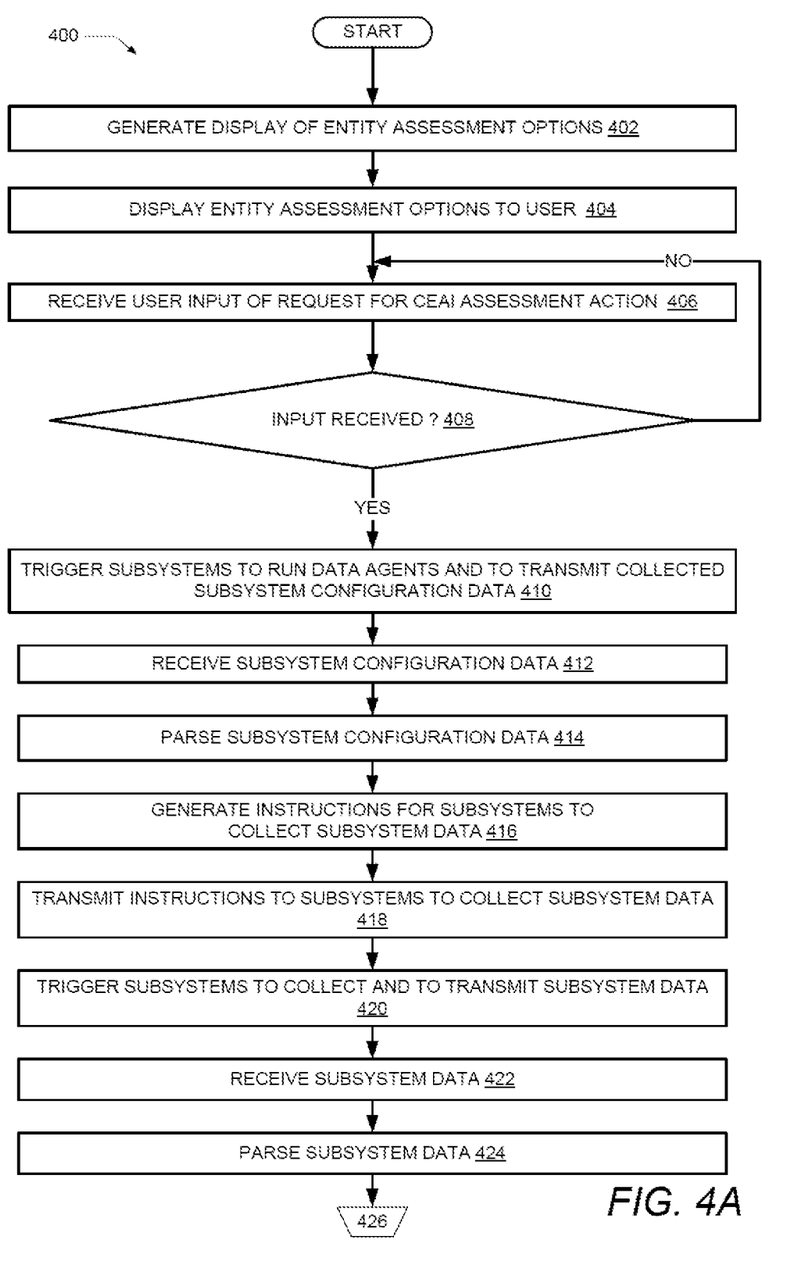
FIGS. 4A and 4B are flow charts that shows steps in an example method of assessing changes to entity configurations in an IICS, according to an example embodiment.
Figure 4B:
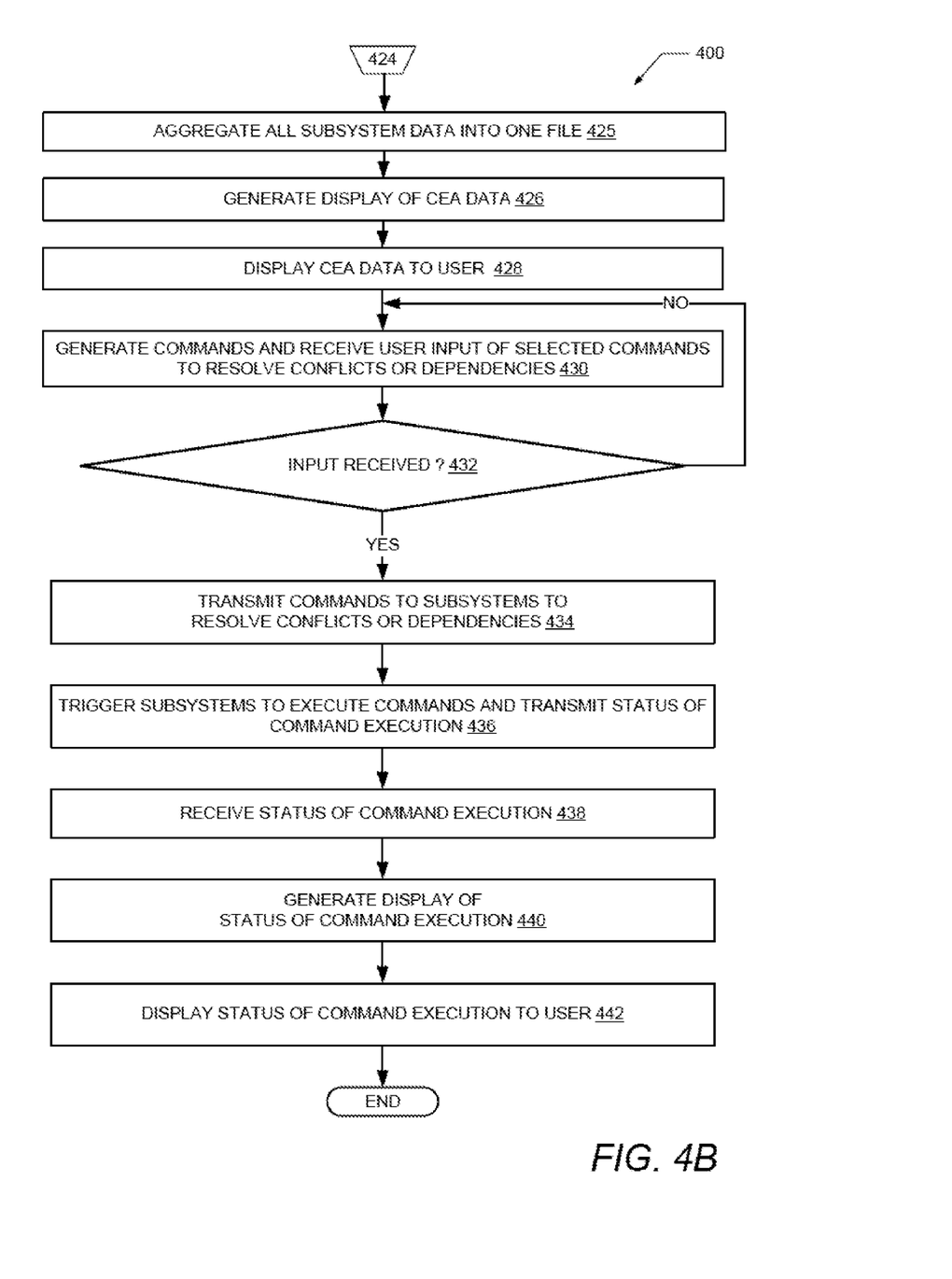

FIGS. 4A and 4B are flow charts showing steps in an example method 400 for assessing the impact of changes to entity configurations across multiple subsystems 140-158 in an IICS 100. With reference to FIGS. 1-4B, method 400 can be implemented via the execution of the CEAI program 122 and its respective modules 310, 312, 314, 316 implemented by processor 112.

Method 400 begins at the start block and proceeds to block 402. At block 402, processor 112 generates a display of entity assessment options at least partially based on user interface data 320. The entity assessment options include a request for cross associations for a selected entity and a list of entities for a user to select from. Processor 112 displays the entity assessment options to a process engineer or other user on display 114 (block 404). Processor 112 receives input from the user via input device 116 of a request for a CEAI assessment action (block 406). In one embodiment, the CEAI assessment action can include a request for cross associations for a list of selected entities. At decision block 408, processor 112 determines if a user has selected a request for a CEAI assessment action. In response to a user not selecting a request for a CEAI assessment action, processor 112 returns to block 406 to wait for user' input. In response to a user selecting a request for a CEAI assessment action, the processor 112 triggers the subsystems 140-158 to execute their respective data agents 222 to collect subsystem configuration data and to transmit the collected subsystem configuration data to CEAI computer 110 (block 410).

At block 412, processor 112 receives the collected subsystem configuration data 324 and stores it to memory 120. Processor 112 parses the collected subsystem configuration data 324 running data parsers 322 (block 414) into a common generic format. In another embodiment, memory 120 can contain pre-stored subsystem configuration data 324, thereby omitting the need for method blocks 410-414 including collecting and transmitting subsystem configuration data from the subsystems to the CEAI computer. Processor 112 generates instructions via provider manager module 314 for the respective subsystems to search and collect subsystem data 224 associated with CEA on their respective subsystem (block 416) and transmits the instructions to the subsystems (block 418). Processor 112 triggers the subsystems to collect the subsystem data associated with CEA and to transmit the subsystem data associated with CEA to CEAI computer 110 (block 420).

Processor 112 receives the subsystem data from each of the subsystems (block 422) and parses the subsystem data into a common generic format using data parsers 322 (block 424). At block 425, processor 112 aggregates all of the received subsystem data into one file as collected subsystem CEA data 328. Processor 112 generates a display of the collected subsystem CEA data 328 (block 426) and displays the collected CEA subsystem data 328 on display 114 to a process engineer or user (block 428). The collected CEA subsystem data 328 can include conflicts and dependencies for the selected entities between subsystems.

An example of a conflict is a given entity that has two different names on the four different subsystems it is included in. The above-described procedure provides this information as A&D data. Now this entity can be renamed say from Entity1 to Entity_1. The user can issue a command to rename this entity from Entity1 to Entity_1 in the A&D data in these 4 subsystems, thus resolving any further inconsistency or conflict.

Another example of a conflict is a given entity being deleted from one of the subsystems with this entity being referred to in four other subsystems. The above-described procedure provides this information as A&D data. A user can issue a command to delete this A&D data in other 4 subsystems, so as to avoid any dangling connections, thus avoiding any further inconsistency or conflict.

Processor 112 generates a display of commands and receives input from the user via input device 116 of a selection of one or more commands 326 to resolve the conflict or dependency (block 430). At decision block 432, processor 112 determines if a user has provided input of one or more commands. In response to a user not providing input, processor 112 returns to block 430 to wait for user input. In response to a user selecting one or more commands to resolve the conflict or dependency, processor 112 via orchestration module 312 and command manager module 316, parses the user input into a command format and syntax based on the subsystem configuration data 324 that is identifiable by the respective subsystem and transmits the commands 326 to the respective subsystems (block 434).

Processor 112 triggers the subsystems to execute the commands 326 to resolve the conflicts or dependencies (block 436) and to transmit a status report of the result of the execution of the commands to resolve the conflicts or dependencies. Processor 112 receives the status report of the result of the execution of the commands to resolve the conflicts or dependencies (block 438), generates a display of the status report (block 440) and displays the status report on display 114 to the process engineer or user (block 442). Method 400 then ends.

Figure 5:
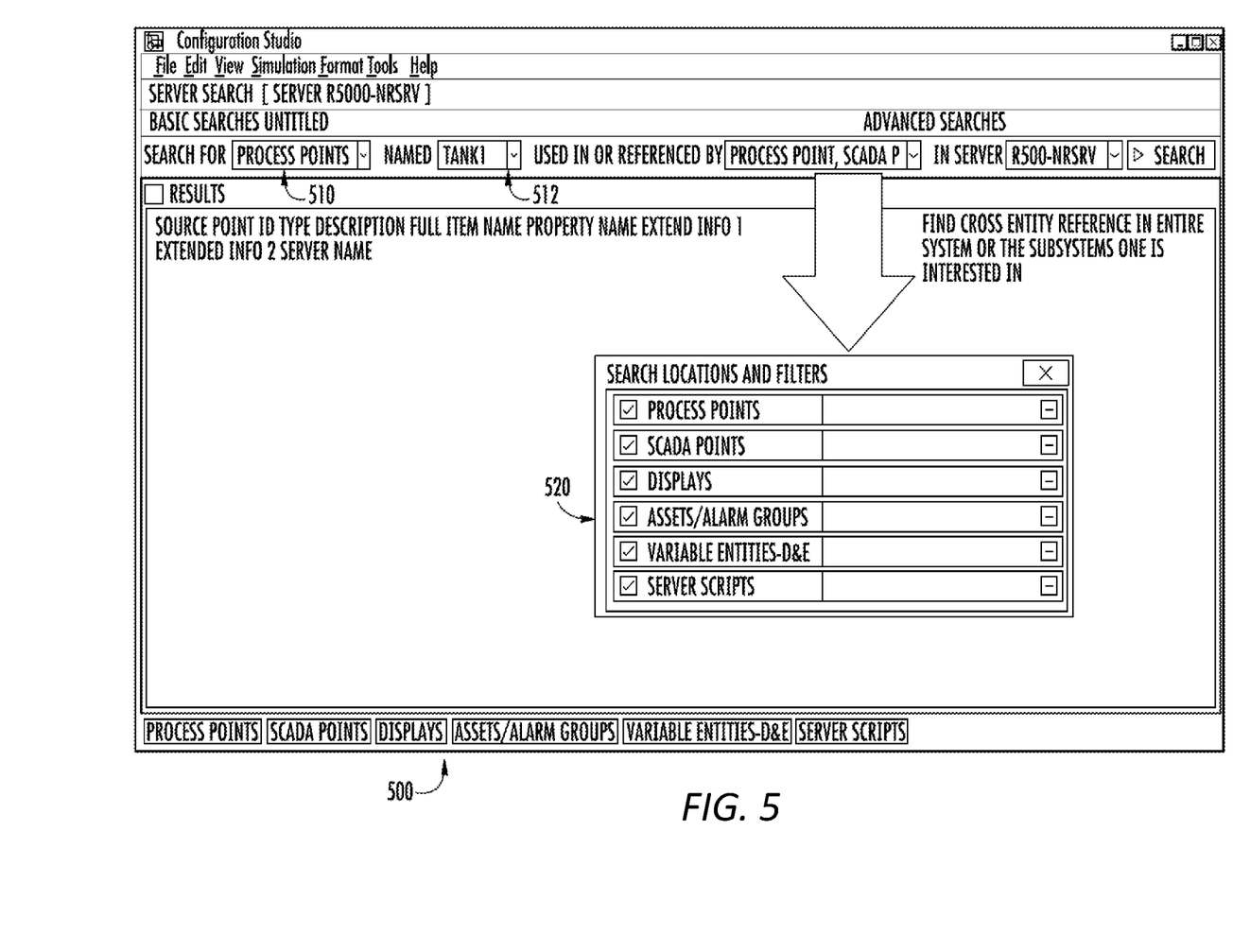
FIG. 5 illustrates a representation from an example actual screenshot of a user selection screen, according to an example embodiment.

FIG. 5 is a representation from an example actual screenshot of a user selection screen 500 used in making a request for cross associations for a selected entity. User selection screen 500 includes entity assessment options including a list of entity types 510 to search for and a list of entity names 512 for cross associations to be found for entry by a user who selects from these lists. A process engineer or other user can select the entity types 510 and entity name 512 using the input device 116 shown in FIG. 1. User selection screen 500 further includes detected subsystems 520 that are the cross entity process points relative to the selected entity type 510. A process engineer or other user can further select any of the subsystem(s) 520 within the system to be analyzed by for cross entity associations by CEAI program 122.

Figure 6:
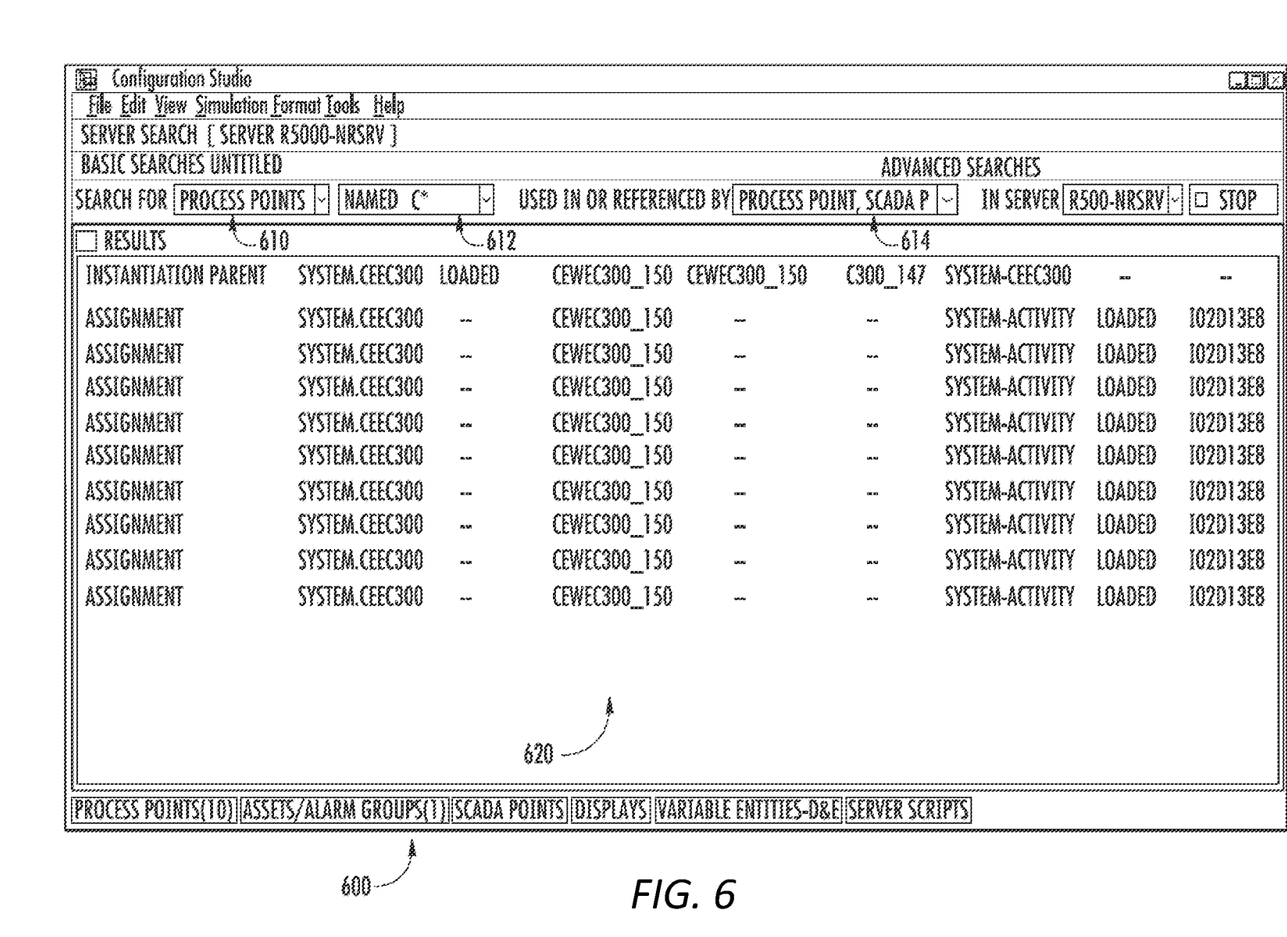
FIG. 6 illustrates a representation from an example actual screenshot of a CEA data display screen, according to an example embodiment.

FIG. 6 is a representation from an example actual screenshot of a CEA data display screen 600 showing example CEA data 124 shown in FIG. 1 retrieved by the CEA program 122 executing on CEAI computer 110. CEA data display screen 600 includes a list of entity types 610 and entity names 612 for a user to select from. CEA data display screen 600 further includes detected subsystems 614 and received subsystem data from the subsystems that is aggregated in a common generic format by the CEAI computer 110 to provide CEA data 620 that is ready to be displayed.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer-readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method of assessing changes within subsystems of an integrated industrial control system (IICS), comprising:
   said IICS including a plurality of said subsystems all in communication with a cross entity association identification (CEAI) computer; each said subsystem including a data agent that has information regarding a data format, a syntax, a network type and a communication method that enables collection of data from the subsystems;
   receiving, by said CEAI computer, a request for cross entity associations for a selected entity relative to other entities in any of said plurality of subsystems, all entities including said selected entity including at least a tag or a point;
   triggering, by said CEAI computer, ones of the data agents in the plurality of subsystems associated with said selected entity to transmit subsystem data related to said selected entity's cross entity association with the other entities to said CEAI computer;
   receiving, by said CEAI computer, said subsystem data;
   parsing, by said CEAI computer, to aggregate said subsystem data in a common generic format to provide cross entity association (CEA) data in said common generic format; and
   displaying, by said CEAI computer, said CEA data associated with said selected entity, wherein said CEA data includes all cross entity associations with the other entities for said selected entity present across any of said plurality of subsystems.

2. The method of claim 1, further comprising:
   generating a first CEAI instruction for said subsystems to collect and transmit said subsystem data, and
   transmitting said first CEAI instruction to said subsystems.

3. The method of claim 2, further comprising:
   generating a display of said CEA data associated with said selected entity.

4. The method of claim 1, further comprising:
   generating a CEAI command to resolve conflicts;
   transmitting said CEAI command to said subsystems; and
   triggering said subsystems to execute said CEAI command and to transmit a status report of said CEAI command execution to said CEAI computer.

5. The method of claim 4, further comprising:
   receiving said status report for said subsystems;
   generating a display of said status reports for said subsystems; and
   displaying said status reports for said subsystems.

6. A system for assessing changes within an integrated industrial control system (IICS), comprising:
   a cross entity association identification (CEAI) computer communicatively coupled by a communication network to a plurality of subsystems, each said subsystem including a data agent that has information regarding a data format, a syntax, a network type and a communication method that enables collection of data from the subsystems, said CEAI computer including a first processor connected to a first memory device having a first non-transitory machine-readable storage medium storing a CEAI program, wherein said CEAI computer is programmed to implement said CEAI program causing said CEAI computer to:
   receive a request for cross entity associations for a selected entity relative to other entities in any one of said plurality of subsystems; all the entities including said selected entity including at least a tag or a point;

trigger ones of the plurality of subsystems associated with said selected entity to transmit subsystem data related to said selected entity's cross entity association with the other entities to said CEAI computer;

receive said subsystem data;

parse to aggregate said subsystem data in a common generic format to provide cross entity association (CEA) data in said common generic format; and display said CEA data associated with said selected entity, wherein said CEA data includes all cross entity associations with the other entities for said selected entity present across any of said plurality of subsystems.

7. The system of claim 6, wherein said CEAI program further causes said CEAI computer to:

generate a first CEAI instruction for said subsystems to collect and transmit said subsystem data; and transmit said first CEAI instruction to said subsystems.

8. The system of claim 7, wherein said CEAI program further causes said CEAI computer to:

generate a display of said CEA data associated with said selected entity.

9. The system of claim 6, wherein said CEAI program further causes said CEAI computer to:

generate a CEAI command to resolve conflicts;

transmit said CEAI command to said subsystems; and trigger said subsystems to execute said CEAI command and to transmit a status report of said CEAI command execution to said CEAI computer.

10. The system of claim 9, wherein said CEAI program further causes said CEAI computer to:

receive said status report for said subsystems;

generate a display of said status reports for said subsystems; and display said status reports for said subsystems.

11. A computer program product, comprising:

a non-transitory data storage medium that includes program instructions executable by a processor to enable said processor to execute a method of assessing changes within subsystems of an integrated industrial control system (IICS), each said subsystem including a data agent that has information regarding a data format, a syntax, a network type and a communication method that enables collection of data from the subsystems, said IICS including a plurality of said subsystems all in communication with a cross entity association identification (CEAI) computer, said CEAI computer including said processor, said computer program product comprising:

code for receiving a request for cross entity associations for a selected entity relative to other entities in any one of said plurality of subsystems; the entities including said selected entity including at least a tag or a point;

code for triggering ones of the plurality of data agents in the subsystems associated with said selected entity to transmit subsystem data related to said selected entity's cross entity association with the other entities to said CEAI computer;

code for receiving said subsystem data;

code for parsing to aggregate said subsystem data in a common generic format to provide cross entity association (CEA) data in said common generic format; and code for displaying said CEA data associated with said selected entity, wherein said CEA data includes all cross entity associations with the other entities present for said selected entity across any of said plurality of subsystems.

12. The computer program product of claim 11, wherein said computer program product further comprises:

code for generating a first CEAI instruction for said subsystems to collect and transmit said subsystem data; and code for transmitting said first CEAI instruction to said subsystems.

13. The computer program product of claim 12, wherein said computer program product further comprises:

code for generating a display of CEA data associated with said selected entity.

14. The computer program of claim 11, wherein said computer program product further comprises:

code for generating a CEAI command to resolve conflicts;

code for transmitting said CEAI command to said subsystems; and code for triggering said subsystems to execute said CEAI command and to transmit a status report of said CEAI command execution to said CEAI computer.

15. The computer program product of claim 14, wherein said computer program product further comprises:

code for receiving said status report for said subsystems;

code for generating a display of said status reports for said subsystems; and code for displaying said status reports for said subsystems.

* * * * *